(12) United States Patent
Yin et al.

(10) Patent No.: US 12,493,152 B2
(45) Date of Patent: Dec. 9, 2025

(54) OPTICAL DEVICE AND FABRICATION METHOD THEREOF

(71) Applicant: Semiconductor Manufacturing International (Shanghai) Corporation, Shanghai (CN)

(72) Inventors: Xiage Yin, Shanghai (CN); Xia Feng, Shanghai (CN); Xiaojun Chen, Shanghai (CN); Dongsheng Zhang, Shanghai (CN); Jiaheng Wu, Shanghai (CN)

(73) Assignee: Semiconductor Manufacturing International (Shanghai) Corporation, Shanghai (CN)

( * ) Notice: Subject to any disclaimer, the term of this patent is extended or adjusted under 35 U.S.C. 154(b) by 300 days.

(21) Appl. No.: 18/128,501

(22) Filed: Mar. 30, 2023

(65) Prior Publication Data

US 2023/0324619 A1 Oct. 12, 2023

(30) Foreign Application Priority Data

Mar. 30, 2022 (CN) .......................... 202210325681.3

(51) Int. Cl.
*G02B 6/30* (2006.01)

(52) U.S. Cl.
CPC .................................... *G02B 6/305* (2013.01)

(58) Field of Classification Search
None
See application file for complete search history.

(56) References Cited

U.S. PATENT DOCUMENTS

| 10,996,398 | B1 * | 5/2021 | Bian | G02B 6/2773 |
| 2009/0324163 | A1 * | 12/2009 | Dougherty | G02B 6/1228 |
| | | | | 385/14 |
| 2022/0120966 | A1 * | 4/2022 | Liu | G02B 6/13 |

* cited by examiner

*Primary Examiner* — Chad H Smith
(74) *Attorney, Agent, or Firm* — Anova Law Group, PLLC (57) ABSTRACT

An optical device and its fabrication method are provided. The method includes: providing a substrate including a coupling region; forming a first dielectric layer on the substrate; forming an initial waveguide groove in the first dielectric layer on the coupling region; forming a patterned layer on a surface of the first dielectric layer and in the initial waveguide groove, exposing at least a portion of a bottom of the initial waveguide groove; and using the patterned layer as a mask to etch the first dielectric layer, to form a waveguide structure on the substrate. The waveguide structure includes a waveguide end structure on the coupling region.

8 Claims, 5 Drawing Sheets

OPTICAL DEVICE AND FABRICATION METHOD THEREOF

CROSS-REFERENCE TO RELATED APPLICATION

This application claims the priority of Chinese Patent Application No. 202210325681.3, filed on Mar. 30, 2022, the content of which is incorporated herein by reference in its entirety.

TECHNICAL FIELD

The present disclosure generally relates to the field of semiconductor technology and, more particularly, relates to an optical device and its fabrication method.

BACKGROUND

Silicon-based optical devices are information functional devices that use light as an information carrier. Because of their low cost, small size, and low power consumption, they are widely used in sensors, communication products, and network products.

Light enters an optical device through an optical fiber to propagate, and the propagation loss mainly occurs at couplings between the optical fiber and a waveguide. Specifically, a waveguide with a gradual size is adopted and the size of an end of the waveguide is gradually reduced to form a small-sized tip which is beneficial to improve the evanescent wave coupling effect in the light propagation process, thereby reducing the coupling loss and improving the light propagation efficiency.

However, in existing technologies, because of process limitations, it is difficult to form waveguide ends with small size, which increases the coupling loss during light propagation and reduces the light propagation efficiency.

SUMMARY

One aspect of the present disclosure provides a fabrication method of an optical device. The method includes: providing a substrate including a coupling region; forming a first dielectric layer on the substrate; forming an initial waveguide groove in the first dielectric layer on the coupling region; forming a patterned layer on a surface of the first dielectric layer and in the initial waveguide groove, exposing at least a portion of a bottom of the initial waveguide groove; and using the patterned layer as a mask to etch the first dielectric layer, to form a waveguide structure on the substrate. The waveguide structure includes a waveguide end structure on the coupling region.

Optionally, a ratio between a depth of the initial waveguide structure and a thickness of the first dielectric layer is about 1:2 to about 1:100.

Optionally, the depth of the initial waveguide structure is about 50 nm to about 200 nm.

Optionally, the waveguide end structure includes a first end and a second end opposite to each other; and a width of the second end is smaller than a width of the first end.

Optionally, the width of the second end is about 100 nm to about 150 nm.

Optionally, the patterned layer is formed by: forming an initial patterned layer on the surface of the first dielectric layer and in the initial waveguide groove, and an upper mask layer on the initial patterned layer, where the upper mask layer exposes part of the initial patterned layer in the initial waveguide groove; and etching the initial patterned layer using the upper mask layer as a mask to form the patterned layer.

Optionally, the patterned layer is made of carbon-containing material, and the upper mask layer is made of a material including photoresist.

Optionally, the substrate further includes a light splitting region and a body region; and the waveguide structure further includes a light splitting structure on the light splitting region and a waveguide body structure on the body region.

Optionally, the method further includes: when forming the initial waveguide groove, forming a light-splitting groove in the first dielectric layer on the light splitting region, where the patterned layer is also located in the light splitting groove; and using the patterned layer as a mask to etch the first dielectric layer, to form the light splitting structure on the light splitting region whose surface is flush with the surface of the waveguide end structure.

Optionally, the patterned layer is also located on the first dielectric layer on the body region. When using the patterned layer as the mask to etch the first dielectric layer to form the waveguide end structure, the waveguide body structure on the body region is also formed. The waveguide body structure includes a third end and a fourth end opposite to each other; and the fourth end is connected to the first end of the waveguide end structure.

Optionally, a top surface of the waveguide body structure is higher than a top surface of the waveguide end structure.

Optionally, a width of the waveguide body structure is larger than a width of the waveguide end structure.

Optionally, the width of the waveguide body structure is about 600 nm to about 1000 nm.

Optionally, before forming the first dielectric layer, the method further includes: forming a coupling waveguide layer on the substrate, including a second dielectric layer on the substrate, a coupling waveguide structure in the second dielectric layer, and a third dielectric layer on the second dielectric layer and the coupled waveguide structure.

Optionally, the first dielectric layer is made of a material including silicon nitride.

Another aspect of the present disclosure provides an optical device. The device includes: a substrate including a light splitting region, a body region, and a coupling region; a second dielectric layer on the substrate; a coupling waveguide structure in the second dielectric layer; a third dielectric layer on surfaces of the second dielectric layer and the coupling waveguide structure; and a waveguide structure on the third dielectric layer. The waveguide structure includes a waveguide body structure, a waveguide end structure, and a light splitting structure. The light splitting structure is located on the third dielectric layer in the light splitting region. The waveguide end structure is located on the third dielectric layer in the coupling region; and the waveguide body structure is located on the third dielectric layer in the body region.

Optionally, the waveguide end structure includes a first end and a second end opposite to each other; and a width of the second end is smaller than a width of the first end.

Optionally, the width of the second end is about 100 nm to about 150 nm.

Optionally, a top surface of the waveguide body structure is higher than a top surface of the waveguide end structure.

Optionally, a width of the waveguide body structure is larger than a width of the waveguide end structure.

In the present disclosure, the initial waveguide groove may be formed in the coupling region, such that at least a portion of the patterned layer formed in the coupling region may be located in the initial waveguide groove. Therefore, the initial waveguide groove may protect the patterned layer in the coupling region, reducing the possibility of peeling of the patterned layer in the coupling region because of other processes and increasing the stability of the patterned layer in the coupling region. Correspondingly, in the subsequent process, the patterned layer in the initial waveguide groove may be able to be used as the mask to etch the first dielectric layer, thereby steadily forming the waveguide end structure. The waveguide end structure may reduce the coupling loss in light transmission and improve the efficiency of light transmission.

Further, at least a portion of the patterned layer formed in the coupling region may be located in the initial waveguide groove, and the initial waveguide groove may protect the patterned layer in the coupling region, reducing the possibility of peeling off of the patterned layer in the coupling region. Therefore, the patterned layer with a smaller size in the coupling region may be formed stably, and then the waveguide end structure with a small size may be also formed stably. The width of the second end of the waveguide end structure may be about 100 nm to about 150 nm. The waveguide end structure may reduce the coupling loss in light transmission and improve the efficiency of light transmission.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

It should be noted that "surface" or "upper" in this specification are used to describe the relative positional relationship in space, and are not limited to whether they are in direct contact.

In existing technologies, because of process limitations, it is difficult to form waveguide ends with small size, which increases the coupling loss during light propagation and reduces the light propagation efficiency.

Figure 1:
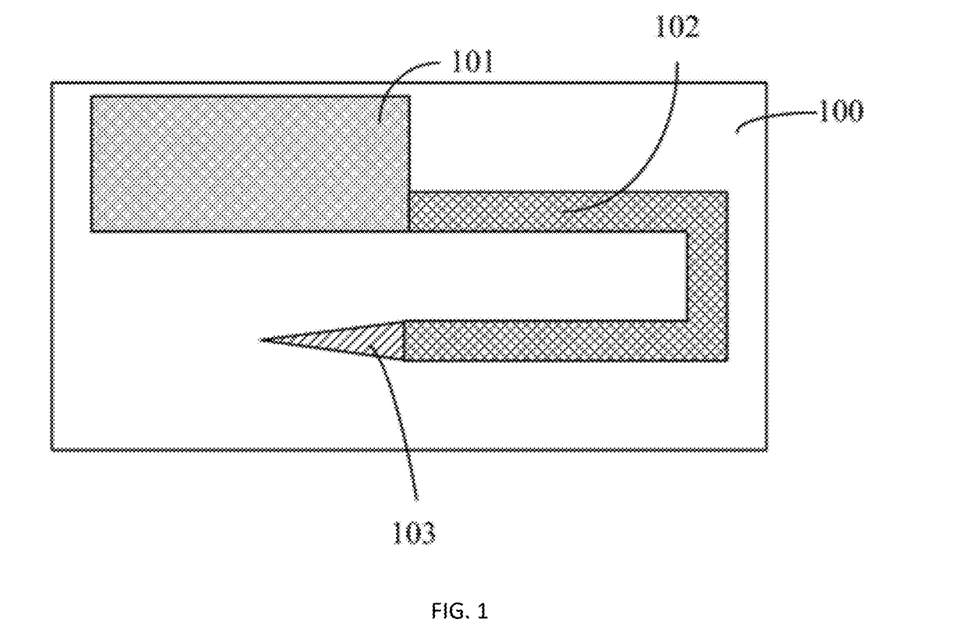
FIG. 1 illustrates an optical device.

FIG. 1 illustrates a top view of an optical device.

The optical device includes: a substrate 100; a light splitting structure 101 on the substrate 100; and a waveguide structure (not shown) on the substrate 100. The waveguide structure includes a waveguide body structure 102 and a waveguide end structure 103. A width of the waveguide end structure 103 is less than a width of the waveguide body structure 102. The waveguide body structure 102 is connected to the waveguide end structure 103, and a height of the waveguide structure is larger than a height of the light splitting structure 101.

The waveguide structure is formed by: forming a first dielectric layer (not shown) on the substrate 100; forming a patterned layer (not shown) on the first dielectric layer; and etching the first dielectric layer by using the patterned layer as a mask to form the waveguide structure. The waveguide structure includes the waveguide end structure 103.

Because of the small width of the waveguide end structure 103, the size of the patterned layer required to form the waveguide end structure 103 is also small, and the small-sized patterned layer is easy to peel off from the surface of the first dielectric layer, therefore destroying the integrity of the patterned layer and making it impossible to form the waveguide end structure 103 subsequently. The overall width of the waveguide structure is larger, which increases the coupling loss in the light propagation process and reduces the light propagation efficiency.

The present disclosure provides an optical device and its fabrication method, to at least partially alleviate the above problem. An initial waveguide groove may be formed first in a first dielectric layer on a coupling region, and then a patterned layer may be formed on the surface of the first dielectric layer and in the initial waveguide groove, such that the patterned layer on the coupling region may be at least partially located in the initial waveguide groove. Therefore, the possibility of peeling off of the patterned layer on the coupling region may be reduced, and then a waveguide end structure may be stably formed by using the patterned layer as the mask. The coupling loss in the light propagation process may be reduced, improving the light propagation efficiency.

The present disclosure provides a fabrication method for forming an optical device. FIGS. 2-7 illustrate structures corresponding to certain stages of a method for forming an optical device, and FIG. 8 illustrates an exemplary method for forming an optical device, provided by one embodiment of the present disclosure.

Figure 2:
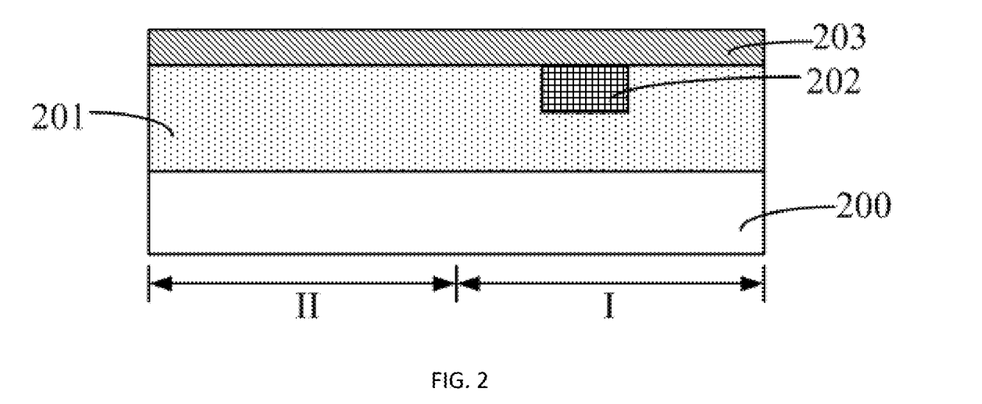
FIGS. 2-7 illustrate structures corresponding to certain stages of forming an exemplary optical device according to various disclosed embodiments of the present disclosure.

As shown in FIG. 2, a substrate 200 may be provided, and a coupling waveguide layer may be formed on the substrate 200.

The substrate 200 may be made of a material including silicon, germanium, SiC, silicon-on-insulator (SOI), germanium-on-insulator (GOI), or a combination thereof. In the present embodiment, the substrate 200 may be made of silicon.

The substrate 200 may include a coupling region I, a light splitting region II, and a body region.

The coupling region I may be used to provide a platform for the formation of a subsequent waveguide end structure. The body region may be used to provide a platform for the formation of a subsequent waveguide body structure. The light splitting region II may be used to provide a platform for the formation of a subsequent light splitting structure.

The coupling waveguide layer may include a second dielectric layer 201 located on the substrate 200, a coupling waveguide structure 202 located in the second dielectric layer 201, and a third dielectric layer 203 located on the second dielectric layer 201 and the coupling waveguide structure 202.

The coupling waveguide structure 202 may be used for receiving the optical signal transmission from the waveguide structure above the coupling waveguide layer, such that the optical signal propagates in the optical device.

The second dielectric layer 201 may be made of a material including silicon oxide. The coupling waveguide structure 202 may be made of a material including silicon. The third dielectric layer 203 may be made of a material including silicon oxide.

The coupling waveguide layer may be formed by: forming a first initial material layer (not shown) on the substrate 200; forming a coupling waveguide material layer (not shown) on the first initial material layer; etching the coupling waveguide material layer to form the coupling waveguide structure 202; forming a second initial material layer (not shown) surrounding the coupling waveguide structure 202, such that the first initial material layer and the second initial material layer constitute the second dielectric layer 201; and forming the third dielectric layer 203 on the second dielectric layer 201 and the coupled waveguide structure 202.

Figure 3:
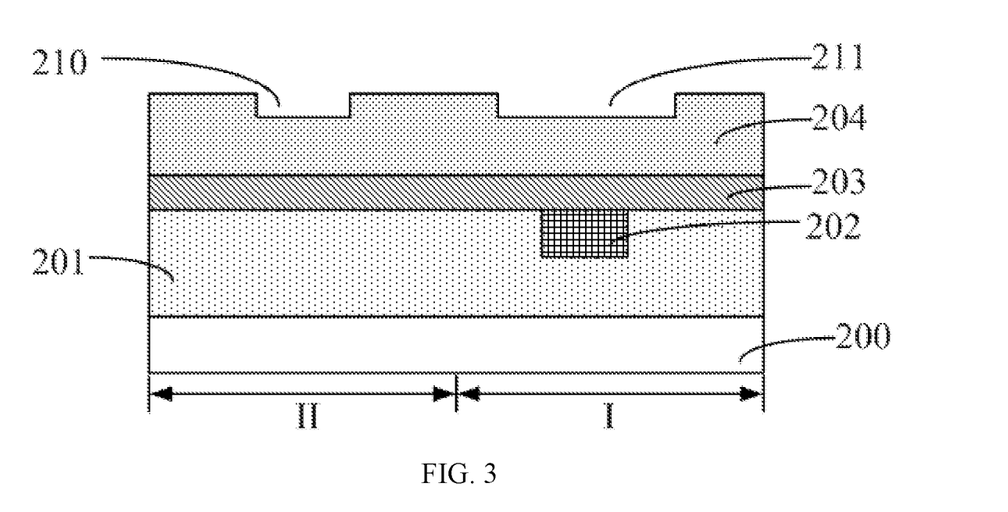

As shown in FIG. 3, a first dielectric layer 204 may be formed on the third dielectric layer, and an initial waveguide groove 211 may be formed in the first dielectric layer 204 on the coupling region I.

The first dielectric layer 204 may be used to provide materials for the subsequently formed waveguide structure.

In one embodiment, the first dielectric layer 204 may be made of a material including silicon nitride.

The function of forming the initial waveguide groove 211 on the coupling region I may be to make the patterned layer subsequently formed on the coupling region I at least partially located in the initial waveguide groove 211, such that the initial waveguide groove 211 may protect the patterned layer on the coupling region I and improve the process stability of the patterned layer formation process.

In one embodiment, a ratio between a depth of the initial waveguide groove 211 and a thickness of the first dielectric layer 204 may be about 1:2 to about 1:100. When the initial waveguide groove 211 is deeper, the protective effect on the patterned layer subsequently formed on the coupling region I may be better, but the thickness of the first dielectric layer 204 below the initial waveguide groove 211 may be relatively small and there may be a certain loss to the height of the waveguide end structure subsequently formed on the coupling region I. Preferably, the initial waveguide groove 211 may have a depth ranging from 50 nanometers to 200 nanometers.

In one embodiment, when forming the initial waveguide groove 211, a light splitting groove 210 may be also formed in the first dielectric layer 204 on the light splitting region II.

By forming the light splitting groove 210 on the light-splitting area II, the height of the first dielectric layer 204 on the light splitting region II may be reduced to a certain extent. Therefore, after the subsequent formation of the light splitting structure and the waveguide body structure, a top surface of the light splitting structure may be lower than a top surface of the waveguide body structure.

In one embodiment, the light splitting groove 210 may be formed simultaneously with the initial waveguide groove 211, and the depth of the light splitting groove 210 may be the same as that of the initial waveguide groove 211.

The light splitting groove 210 and the initial waveguide groove 211 may be formed by: forming a mask structure (not shown) on the surface of the first dielectric layer 204 on the coupling region I and the splitting region II, where the mask structure exposes a portion of the surface of the first dielectric layer 204 on the coupling region I and the splitting region II; and using the mask structure as a mask to etch the first dielectric layer 204 to form the initial waveguide groove 211 located on the coupling region I and the light splitting groove 210 located on the light splitting region II.

Since the light splitting groove 210 and the initial waveguide groove 211 may be formed simultaneously using a same process, the process may be simple and the production cost may be reduced.

Figure 4:
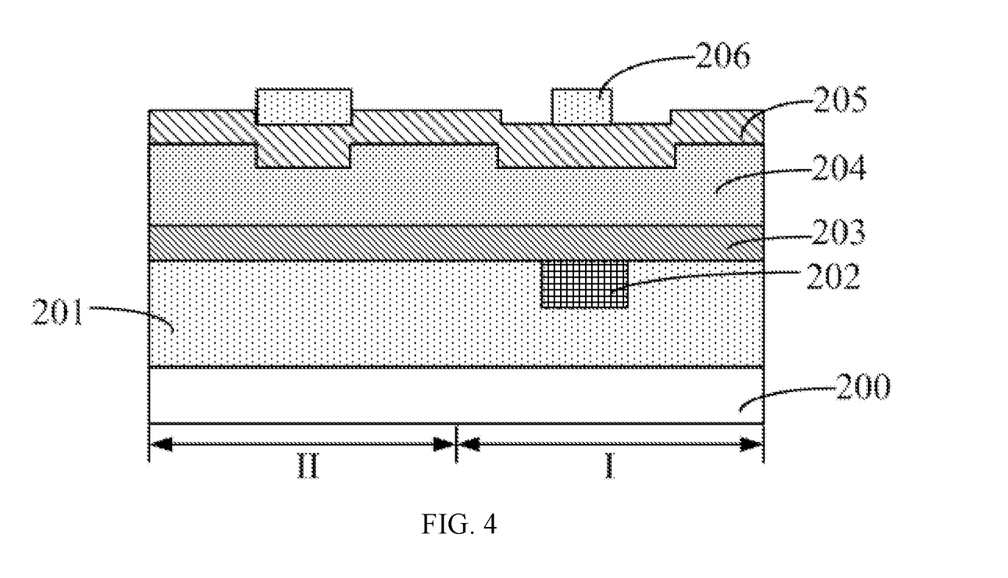
Figure 5:
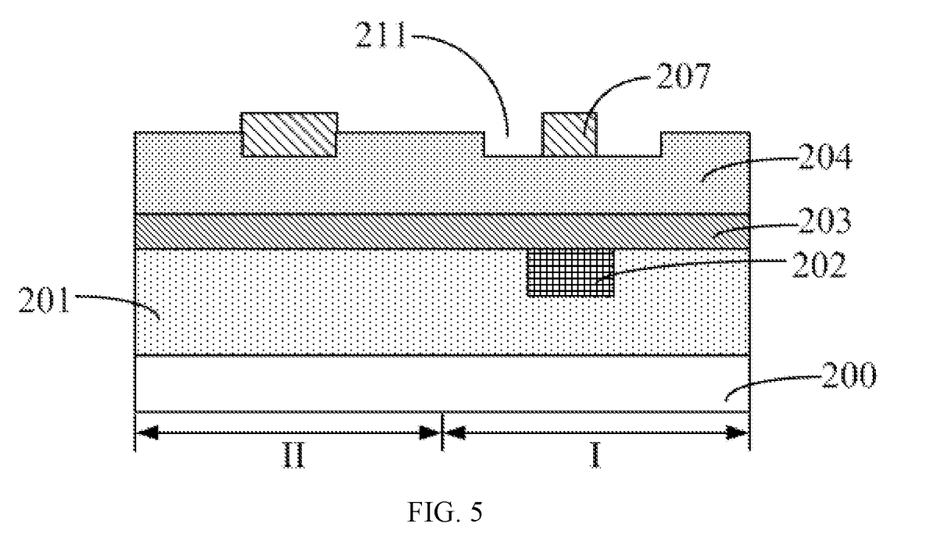

Subsequently, a patterned layer may be formed on the surface of the first dielectric layer 204 and in the initial waveguide groove 211, as shown in FIG. 4 and FIG. 5. The pattern layer may expose at least a portion of a bottom of the initial waveguide groove 211.

As shown in FIG. 4, an initial patterned layer 205 and an upper mask layer 206 located on the initial patterned layer 205 may be formed on the surface of the first dielectric layer 204 and in the initial waveguide groove 211, and the upper mask layer 206 may expose a portion of the initial patterned layer 205 in the initial waveguide trench 211.

The initial patterned layer 205 may be also located in the light splitting groove 210 and on the surface of the first dielectric layer 204 on the body region.

The upper mask layer 206 may be also located on the surfaces of the light splitting region II and the initial patterned layer 205 on the body region. The upper mask layer 206 may expose a portion of the initial patterned layer 205 on the surface of the light splitting region II, such that the upper mask layer 206 on the light splitting region II covers the surface of the initial patterned layer 205 on the light splitting groove 210. The upper mask layer 206 may be also located on the surface of the initial patterned layer 205 on the body region, and the upper mask layer 206 may expose a portion of the initial patterned layer 205 on the body region.

In one embodiment, the initial patterning layer 205 may be made of a carbon-containing material. The upper mask layer 206 may be made of a material including photoresist.

Since the material of the initial patterned layer 205 on the first dielectric layer 204 has higher hardness and density, and thus better stability, in the subsequent etching process of the first dielectric layer 204, the process window may be bigger.

As shown in FIG. 5, using the upper mask layer 206 as a mask to etch the initial pattered layer 205, to form a patterned layer 207.

The patterned layer 207 may expose at least a portion of the bottom of the initial waveguide groove 211. Specifically, in one embodiment, the patterned layer 207 on the coupling region I may be located in the initial waveguide groove 211.

Since the patterned layer 207 on the coupling region I is used to subsequently form a small-sized waveguide end structure, the size of the patterned layer 207 on the coupling region I may be relatively small. The patterned layer 207 on the coupling region I may be located in the initial waveguide groove 211, such that the initial waveguide groove 211 protects the patterned layer 207 on the coupling region I to reduce the possibility that the patterned layer 207 on the coupling region 1 is peeled off due to the influence of other processes. The stability of the patterned layer 207 on the coupling region 1 may be improved, and then the patterned layer 207 in the initial waveguide groove 211 may be used as the mask subsequently to etch the first dielectric layer 204. Therefore, the small-sized waveguide end structure may be formed stably to reduce coupling loss during light propagation.

In one embodiment, the patterned layer 207 may be also located in the light splitting groove 210 and on the first dielectric layer 204 on the body region, for subsequent formation of a light splitting structure on the light-splitting region II, and a waveguide body structure on the body region.

Figure 6:
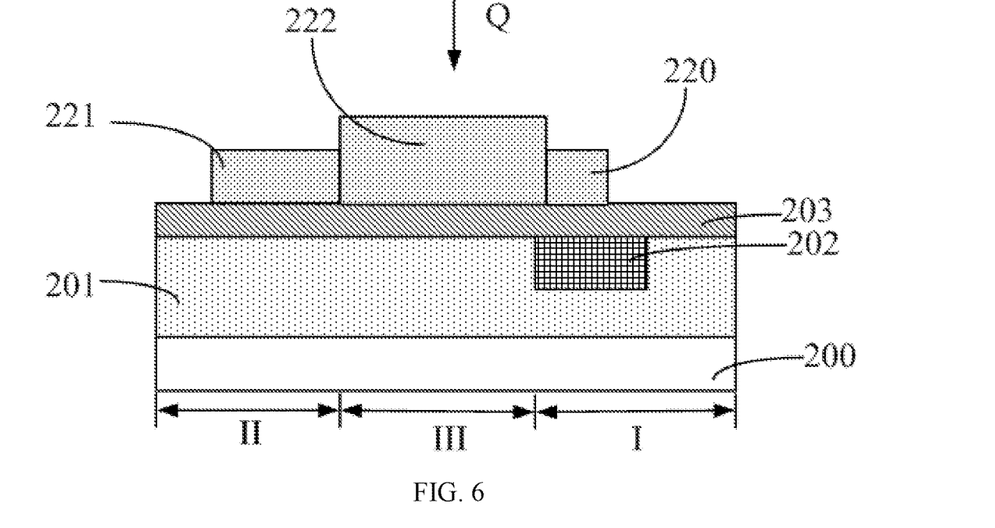
Figure 7:
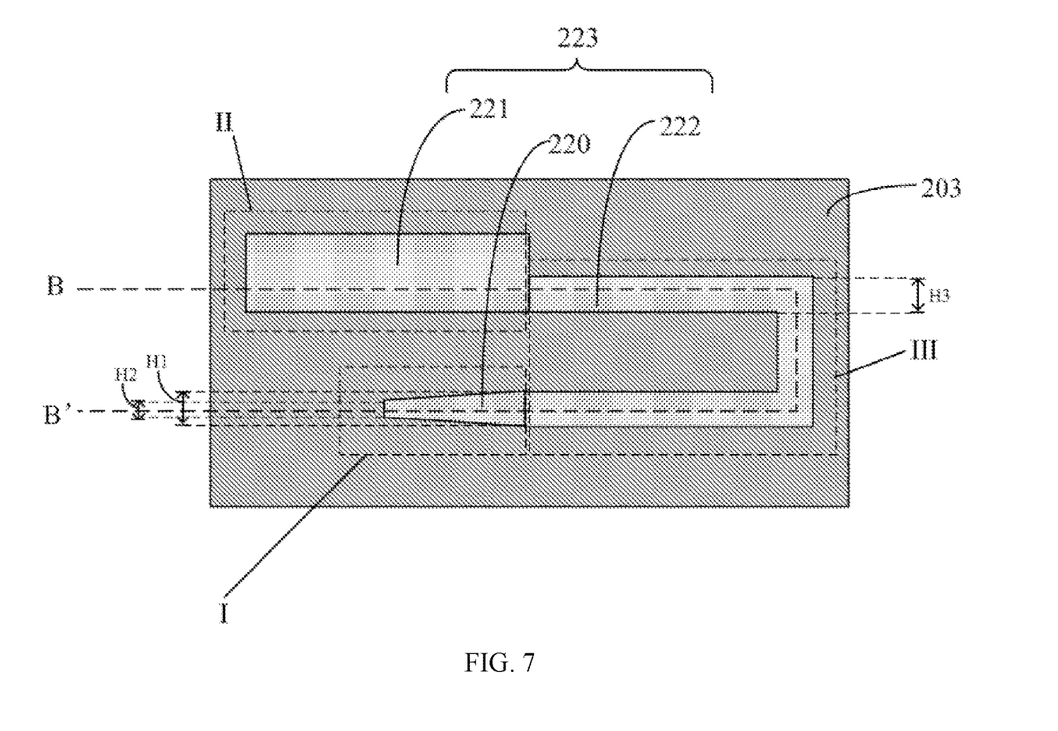
Figure 8:
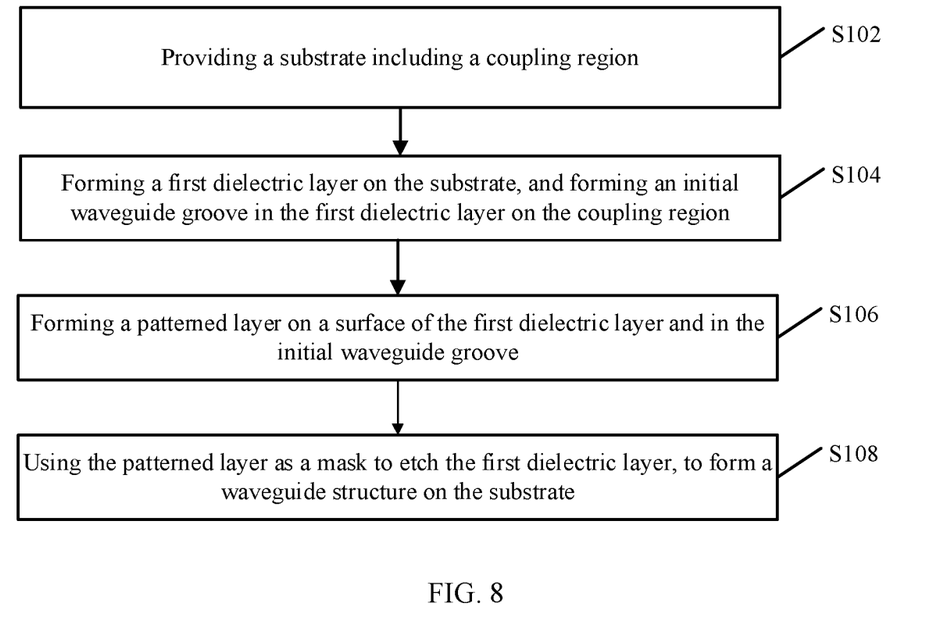
FIG. 8 illustrates an exemplary method for forming an optical device according to various disclosed embodiments of the present disclosure.

FIG. 6 is a cross-sectional view along a BB' direction in FIG. 7, and FIG. 7 is a top view along a Q direction in FIG. 6. As shown in FIG. 6 and FIG. 7, the patterned layer 207 may be used as a mask to etch the first dielectric layer 204, to form a waveguide structure 223 on the third dielectric layer 203. The waveguide structure 223 may include a waveguide end structure 220 on the coupling region I.

The waveguide structure 223 may be used as a medium for optical signal propagation. After entering the waveguide structure 223, because of evanescent wave coupling, the optical signal may be displaced to the coupling waveguide structure 202 below the waveguide structure 223 and continue to propagate.

The waveguide end structure 220 may have a first end (not marked) and a second end (not marked) opposite to each other. A width H2 of the second end may be smaller than a width H1 of the first end.

It should be noted that the width is a dimension of the waveguide end structure 220 in a direction parallel to the surface of the substrate 200 and perpendicular to the extension direction of the waveguide end structure 220.

Specifically, the width H1 of the first end may range from 600 nm to 1000 nm; and the width H2 of the second end may range from 100 nm to 150 nm.

Since the patterned layer 207 formed on the coupling region I may be located in the initial waveguide groove 211, the initial waveguide groove 211 may protect the patterned layer 207, and the possibility that the portion of the patterned layer 207 in the initial waveguide groove 211 is peeled off may be small. Therefore, the small-sized patterned layer 207 formed on the coupling region I may have higher stability in subsequent processes. Correspondingly, after the first dielectric layer 204 is etched using the patterned layer 207 as a mask, the small-sized waveguide end structure 220 located on the coupling region I may be stably formed.

Because of the small size of the waveguide end structure 220, when the optical signal is displaced from the waveguide end structure 220 to the coupling waveguide structure 202 and continues to propagate, the coupling loss generated may be small, thereby improving the optical propagation efficiency and the performance of the optical device.

The width of the waveguide end structure 220 may gradually shrink from the first end to the second end. Since the width of the waveguide end structure 220 gradually decreases, the stability of the waveguide end structure 220 may be better.

In one embodiment, the waveguide structure 223 may further include a light splitting structure 221 on the light splitting region II and a waveguide body structure 222 on the body region III.

The light splitting structure 221 and the waveguide body structure 222 may be formed by: using the patterned layer 207 as a mask to etch the first dielectric layer 204 to form the light splitting structure 221 on the light splitting region II, and a waveguide body structure 222 located on the body region III. The light splitting structure 221, the waveguide body structure 222 and the waveguide end structure 220 may be formed simultaneously.

The light splitting structure 221 may be connected to an external optical fiber and the waveguide body structure 222. A surface of the light splitting structure 221 may be flush with the surface of the waveguide end structure 220. The top surface of the waveguide body structure 222 may be higher than the top surface of the light splitting structure 221.

The waveguide body structure 222 may include a third end (not marked) and a fourth end (not marked) opposite to each other. The fourth end may be connected to the first end of the waveguide end structure 220, and the third end may be connected to the light splitting structure 221. The top surface of the waveguide body structure 222 may be higher than the top surface of the waveguide end structure 220.

The width H3 of the waveguide body structure 222 may be larger than the width of the waveguide end structure 220. The width H3 of the waveguide body structure 222 may range from 600 nm to 1000 nm.

In the process of optical signal propagation, light may enter the light splitting structure 221 from an external optical fiber for light splitting, enter the waveguide body structure 222 to propagate, and finally pass through the small-sized waveguide end structure 220 to be displaced to the coupling waveguide structure 202 below the waveguide structure 223 efficiently with low loss for continuous propagation.

After forming the light splitting structure 221, the waveguide body structure 222, and the waveguide end structure 220, a fourth dielectric layer (not shown) surrounding the light splitting structure 221, the waveguide body structure 222, and the waveguide end structure 220 may be formed.

The fourth dielectric layer may be made of a material including silicon oxide.

In the optical device and its fabrication method provided by various embodiments of the present disclosure, the initial waveguide groove may be formed in the coupling region, such that at least a portion of the patterned layer formed in the coupling region may be located in the initial waveguide groove. Therefore, the initial waveguide groove may protect the patterned layer in the coupling region, reducing the possibility of peeling of the patterned layer in the coupling region because of other processes and increasing the stability of the patterned layer in the coupling region. Correspondingly, in the subsequent process, the patterned layer in the initial waveguide groove may be able to be used as the mask to etch the first dielectric layer, thereby steadily forming the waveguide end structure. The waveguide end structure may reduce the coupling loss in light transmission and improve the efficiency of light transmission.

Further, at least a portion of the patterned layer formed in the coupling region may be located in the initial waveguide groove, and the initial waveguide groove may protect the patterned layer in the coupling region, reducing the possibility of peeling off of the patterned layer in the coupling region. Therefore, the patterned layer with a smaller size in the coupling region may be formed stably, and then the waveguide end structure with a small size may be also formed stably. The width of the second end of the waveguide end structure may be about 100 nm to about 150 nm. The waveguide end structure may reduce the coupling loss in light transmission and improve the efficiency of light transmission.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:
1. An optical device, comprising:
a substrate;
a first dielectric layer on the substrate;
a coupling waveguide structure in the first dielectric layer;
a second dielectric layer on surfaces of the first dielectric layer and the coupling waveguide structure;
a waveguide structure on the second dielectric layer, the coupling waveguide structure being under the waveguide structure and over the substrate, wherein:
the waveguide structure includes a waveguide body structure, a waveguide end structure, and a light splitting structure;
along a surface of the second dielectric layer,
  a first end of the waveguide body structure connects to an end of the light splitting structure and a second end of the waveguide body structure connects to a first end of the waveguide end structure, together forming a bending structure; and
  a top surface of the waveguide body structure is higher than a top surface of each of the light splitting structure and the waveguide end structure.

2. The device according to claim 1, wherein:
the waveguide end structure includes a second end opposite to the first end; and
a width of the waveguide end structure is increased gradually from the second end to the first end, and a width of the second end is smaller than a width of the first end.

3. The device according to claim 2, wherein:
the width of the second end is about 100 nm to about 150 nm.

4. The device according to claim 1, wherein:
the top surface of the waveguide end structure is coplanar with the top surface of the light splitting structure.

5. The device according to claim 1, wherein:
a width of the waveguide body structure is larger than a width of the waveguide end structure.

6. The device according to claim 5, wherein:
the width of the waveguide body structure is about 600 nm to about 1000 nm.

7. The device according to claim 1, wherein:
a width of the light splitting structure is greater than a width of each of the waveguide body structure and the waveguide end structure.

8. The device according to claim 1, wherein:
the substrate includes a light splitting region, a coupling region, and a body region therebetween;
the light splitting structure is located on the second dielectric layer in the light splitting region;
the waveguide body structure is located on the second dielectric layer in the body region; and
the waveguide end structure is located on the second dielectric layer in the coupling region.

* * * * *